Figure 1:
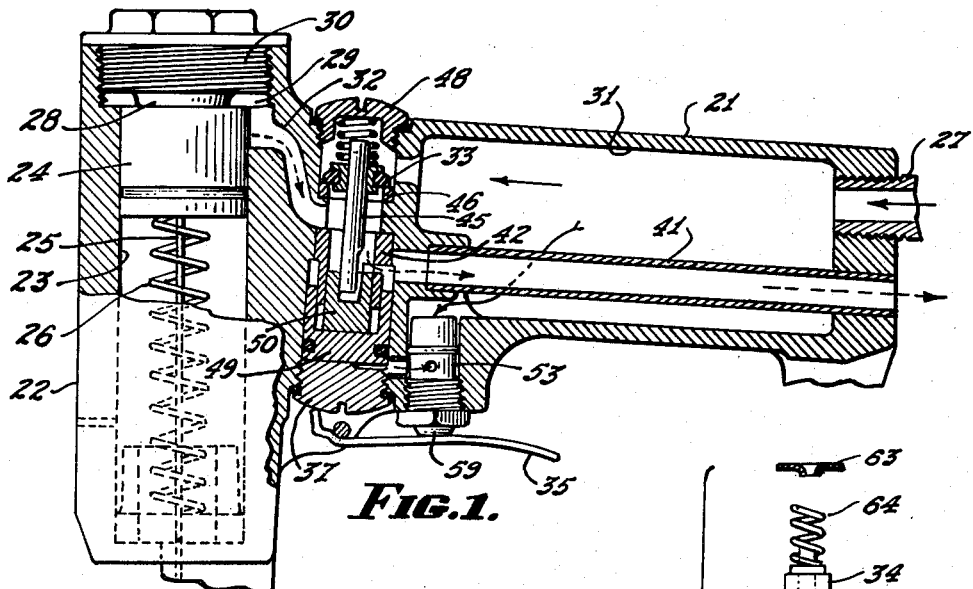

Sept. 27, 1960

A. G. JUILFS 2,954,009

REMOTE CONTROL AIR VALVE

Filed June 10, 1959

2 Sheets-Sheet 1

INVENTOR.
ALBERT G. JUILFS.
BY
Allen & Allen
ATTORNEYS.

Sept. 27, 1960          A. G. JUILFS          2,954,009
                      REMOTE CONTROL AIR VALVE
Filed June 10, 1959                           2 Sheets-Sheet 2

INVENTOR.
ALBERT G. JUILFS,
BY
Allen & Allen
ATTORNEYS.

United States Patent Office 2,954,009
Patented Sept. 27, 1960

2,954,009

REMOTE CONTROL AIR VALVE

Albert G. Juilfs, Newtown, Ohio, assignor to Senco Products, Inc., Fairfax, Ohio, a corporation of Ohio Filed June 10, 1959, Ser. No. 819,387

10 Claims. (Cl. 121—21)

This invention resides in valve structure wherein a first valve, manually operated, introduces fluid power to a second valve in order to actuate same, the second valve thereafter controlling application of fluid power for the purpose desired.

This invention is particularly well suited for valve arrangements in which a trigger is pulled or squeezed to actuate a valve for control of fluid power. In the drawings and description to follow the valve arrangement is illustrated as applied to a pneumatic stapler. This is primarily for sake of illustration and it is to be understood that although the invention is described and shown in connection with particular structures and arrangements, these particular structures and arrangements are not to constitute limitations on the invention except insofar as they are specifically set forth in the claims appended hereto.

In recent years pneumatic staplers have achieved a prominent place in industry as a production line tool. It is not unusual for an operator to drive ten to fifteen thousand staples during the course of an eight hour working day. A very important object of this invention, therefore, is to reduce the pressure necessary to squeeze the trigger, and to reduce the distance through which the trigger must be moved in order to apply air to drive a piston and staple driver so as to drive a staple into work.

Another important object of this invention is to provide a valve arrangement which is much less fatiguing than are other presently known arrangements, and which will operate much faster and with absolute consistency, regardless of the speed with which the trigger is pulled.

In most of the presently known valve arrangements for pneumatic staplers it is necessary to move the trigger about ¾ of an inch in order to effectively drive a staple from the stapler into work. A specific object of this invention is to reduce the amount of trigger movement to about one thirty-second (1/32) of an inch, thus making the tool faster and easier to use.

These and other objects of this invention will become apparent to those skilled in the art during the course of the following description and from reference to the accompanying drawings, in which drawings like numerals are employed to designate like parts throughout and in which—

Figure 2:
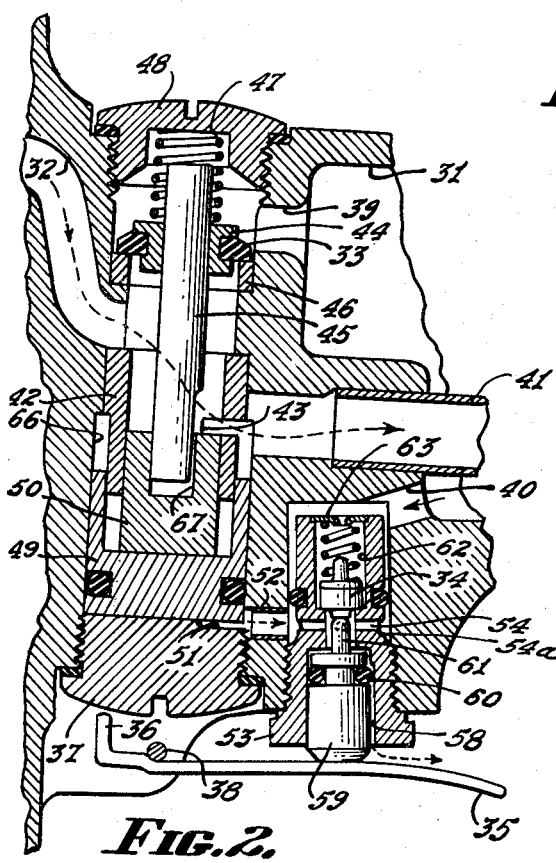
Figure 3:
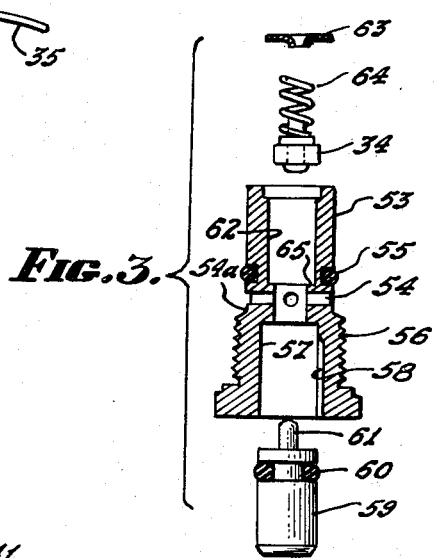
Figure 4:
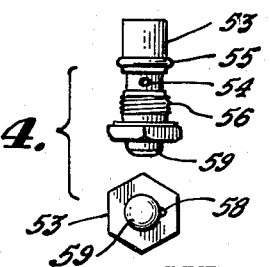
Figure 5:
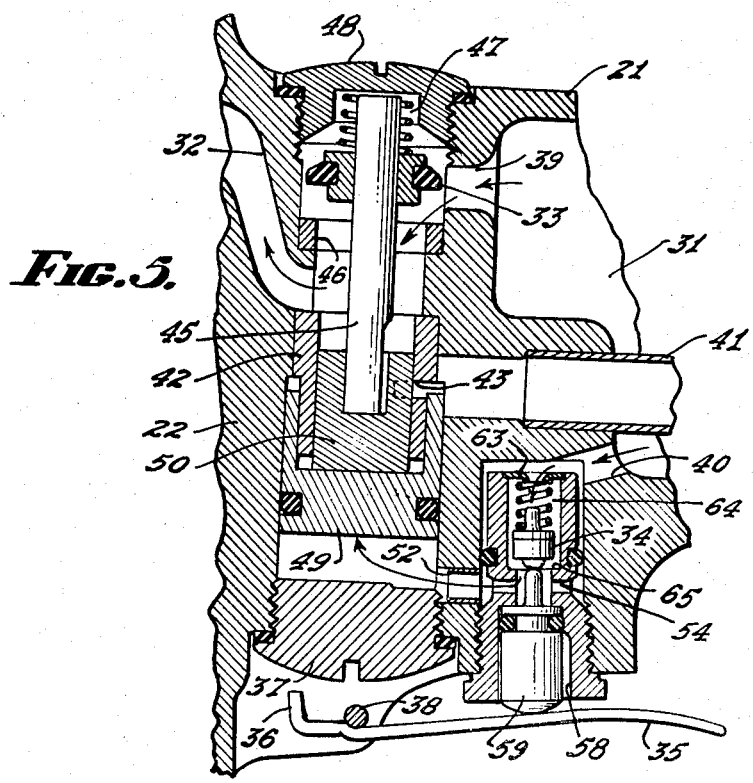
Figures 6, 7:
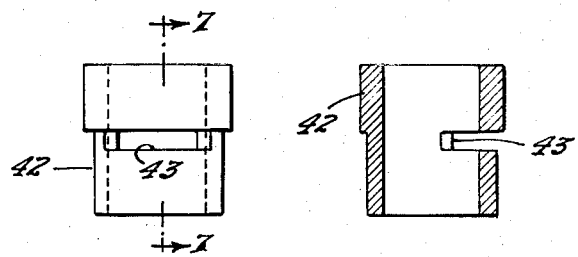

Figure 1 is a fragmentary sectional view, with parts broken away, showing the invention as applied to a pneumatic stapler, Figure 2 is an enlarged, fragmentary sectional view showing one position of the valve parts of this invention, Figure 3 is an enlarged, exploded sectional view of one group of the valve parts included in this invention, Figure 4 shows a side elevation and bottom plan view of a portion of the valve arrangement, Figure 5 is an enlarged fragmentary sectional view showing a different position for the valve parts, Figure 6 is a side elevation of one of the valve members, and Figure 7 is a section taken on the line 7—7 of Figure 6.

In Figure 1 the invention is shown as applied to a pneumatic stapler; this is by way of example only. The stapler comprises a handle section 21 and a main body 22 having a cylinder 23 in which a piston 24 is reciprocable. A staple driver 25 is actuated by the piston 24 and a spring 26 serves to return the piston after it has been moved so as to drive a staple into work. It will be understood by those skilled in the art that the driver 25 is reciprocable within a slot provided in nose structure at the lower part of the body 22, there being conventional means for introducing a succession of staples into this slot ahead of the driver so that on each downward movement of the piston 24 a staple is engaged by the driver 25 and driven into work. All of the means so far described are now well known in the art and do not constitute a specific part of this invention.

Air is brought to the tool by means of a connection 27 to a suitable source of compressed air, not shown. The piston 24 abuts a member 28 so as to leave a clearance 29 about the top of the piston, beneath the cylinder cap 30. Air is stored in the chamber 31 provided in the handle 21. A passage 32 leads to the clearance 29. The invention resides in the valve means for admitting air from the chamber 31 into the passage 32 so as to drive the piston 24 downwardly in the cylinder 23 for engaging a staple by the driver 25 and forcing the staple from the tool into work.

Between the large air chamber 31 and the passage 32 is a firing valve assembly which includes the member 33 and which is controlled by the operation of a remote valve assembly which includes the member 34, see Figure 5. This latter valve is actuated by manually squeezing the trigger 35 through a very small distance, in the neighborhood of one thirty-second (1/32) of an inch. The trigger has a stop 36 which abuts the plug 37 so that it normally will be in the position indicated in Figure 2. The pivot pin for the trigger is indicated at 38.

There are a pair of passages leading from the chamber 31 to the valve members. In the upper part of this chamber a passage 39 communicates with the firing valve so as to introduce air in the region of the firing valve member 33. In the lower part of the chamber there is a passage 40 which introduces air for the remote control valve in the region of the member 34. There is an exhaust tube 41 which extends through the chamber 31 in the handle 21. In the firing valve assembly there is a sleeve 42 having an arcuate port 43 therein. This particular member is also shown in detail in Figures 6 and 7. The firing valve member 33 is attached to a sleeve 44 which is fixed on the valve stem 45. The member 33 abuts a valve seat 46. A spring 47, which abuts the sleeve 44 and the cap 48, serves to aid in maintaining the valve member 33 on the seat 46. The cap is shown as screwed into the handle section of the stapler.

In the position of the parts illustrated in Figure 2, air is free to exhaust through the passage 32, around the valve stem 45, through the sleeve 42 and its port 43, and out through the exhaust tube 41. This exit path is illustrated by dotted-line arrows in this figure. Air cannot pass from the chamber 31 to the passage 32 since the valve member 33 is seated on its seat 46.

The firing valve assembly includes a skirted piston 49 and a member 50 which rests within the recess and which is reciprocable within the sleeve 42 which is fixed in position. The skirted piston 49 is reciprocable about the outer side of the lower portion of this sleeve 42. The lower cap 37, which is illustrated as screwed into the stapler, is provided with a relieved portion 51 so that there is a clearance about a portion, at least, of the valve piston 49 when it abuts this cap 37 as shown in Figure 2. There is a passage extending between the clearance area 51 and the remote control valve assembly, which includes the valve member 34. As shown in Figure 3 there is a threaded sleeve 53. At about the middle of this sleeve two holes 54 are provided, which holes extend at right angles to one another, are located in the same horizontal plane and extend completely through the sleeve. These holes 54 communicate with a circular relief groove 54a provided around the outside of the sleeve 53. This insures proper communication of the holes 54 with the passage 52. Immediately above these holes is fixed an O-ring 55. The lower part of the sleeve 53 is threaded as indicated at 56 so that it can be screwed into the handle 21.. In this lower part there is a cylinder 57 and a small groove 58. Slidable in the cylinder 57 is the valve button 59 which has an O-ring and a short stem 61.

In the upper part of the remote control valve sleeve 53 there is a chamber 62. The valve member 34 is movable axially within this chamber. A cap 63, having a hole located centrally therein is adapted to be fixed in the top of the sleeve 53. A very small, relatively weak spring 64 extends between the cap 63 and member 34 so as to normally maintain the member 34 on its seat 65. The remote control valve assembly shown in exploded condition in Figure 3 is shown in assembled condition, in side elevation, in Figure 4.

In the position of parts illustrated in Figure 2 air from the chamber 31 is unable to reach the clearance area 51 since the valve member 34 is seated on its seat 65, thus blocking air which travels through the passage 40 and through the cap 63 into the chamber 62. Air, however, which is in the area 51 may exhaust through the passage 52, the hole 54 in the sleeve 53, around the stem 61 and through the groove 58 located in the cylinder 57 in the lower part of the sleeve 53. In this position of parts the trigger 35 is at rest, that is, in its lowermost position as governed by abutment of the stop 36 with the cap 37. The button 59 rests against the trigger 35 and in this position the O-ring 60 is spaced from the upper end of the groove 58 so that air may exhaust in the manner just described. This is also indicated by the dotted line arrows in this portion of Figure 2.

Referring now particularly to Figures 2 and 5 the operation of the remote control air valve will be described, keeping in mind that Figure 2 shows the parts in the at-rest position and Figure 5 shows the position of these parts when the trigger is squeezed. The operator will squeeze the trigger, moving it only about one thirty-second (1/32) of an inch. The O-ring 60 carried by the button 59 will prevent exhaust of air through the groove 58. In this position of the button air can no longer exhaust from the clearance area 51. Upward movement of the button 59 as caused by squeezing the trigger 35 also moves the valve member 34 from its seat 65. The member 34 is engaged by the stem 61 and will be moved in opposition to the small, weak spring 64. With the member 34 thus unseated air may pass through the passage 40, into the chamber 62 via the hole in the cap 63, around the valve member 34, through the holes 54, through the passage 52 and so to the clearance area 51.

When air reaches the clearance area 51 it moves the piston 49 upwardly in the cylinder 66. The member 50 is hollowed as indicated at 67 to receive the lower end of the valve stem 45. Initial movement of the member 50 brings the bottom of the hollow 67 into contact with the lower part of the stem 45. Such movement of the member 50 serves to block the exhaust port 43 in the sleeve 42. Air may no longer escape from the passage 32 through this port 43. Further movement of the piston 49 and its member 50 serves to move the valve stem 45 upwardly and thus lift the member 33 from its seat 46. This movement is in opposition to the spring 47. In this position of the parts air travels from the chamber 31, through the passage 39, around the valve member 33, around the valve stem 45 and into the passage 32 which directs the air to the clearance 29 above the piston 24. Thus a very small movement of the trigger 35 results in actuation of the firing valve member 33 whereupon the stapler is activated.

The air flows just described as happening upon squeezing of the trigger 35 are clearly illustrated by the solid line arrows in Figure 5. Thus a very slight movement of the trigger 35 serves to block the exhaust groove 58 and lift the member 34 from its seat 65 whereupon air from the chamber 31 flows through the passage 40, through the cap 63, around the member 34, through the passage 54, through the passage 52 and into the clearance 51 whereby to drive the firing valve piston 49 upwardly to effect actual operation of the particular tool with which this remote control valve arrangement is associated. As the firing valve piston 49 is thus actuated by air made available by the slight movement of the trigger 35, the exhaust port 43 is closed and the valve member 33 is lifted from its seat 46 whereupon air moves from the chamber 31, through the passage 39, around the member 33, around the stem 45 and into the passage 32 whereby to furnish compressed air needed for actuating the tool proper.

As above indicated, upon release of the trigger 35, the parts will move from the position of Figure 5 to that of Figure 2. The trigger 35 will move until its stop 36 abuts the cap 37 and the valve button 59 will move downwardly under the influence of the small spring 64 and air pressure. This opens the exhaust passage 58 while the valve member 34 abuts its seat 65. Air under the piston 49 exhausts through the passage 52, hole 54 and groove 58. The firing valve piston 49 and its member 50 also move downwardly under the initial influence of a spring 47 and air pressure. This opens the exhaust port 43 so that air from the tool proper may exhaust through the passage 32, around the valve stem 45, through the port 43 and out the exhaust tube 41. As this exhaust route opened, the valve member 33 abutted its seat 46, all as shown in Figure 2. These cycles will be repeated upon another squeezing and release of the trigger 35.

It is believed that the operation of this remote control air valve has been clearly set forth herein. Again it will be understood that while the invention has been shown as embodied in an arrangement particularly suitable for effecting operation of pneumatic staplers, it will be apparent that modifications may be made in the invention without departing from its scope and spirit. And the invention is not to be limited to the particular embodiment illustrated in the figures except insofar as the structure constituting such embodiment is specifically included in the subjoined claims.

Having thus described the invention, what is claimed as new and what is desired to be protected by United States Letters Patent is:

1. A remote control air valve including a main firing valve assembly for introducing compressed air from a suitable source to mechanism to be air activated and a trigger valve assembly to actuate said firing valve assembly; said trigger valve assembly including a first valve seat, a first valve member normally seating in air tight relationship on said first valve seat, and means to move said first valve member from said first valve seat; said firing valve assembly including a second valve seat, a second valve member normally seating in air tight relationship on said second valve seat, and a piston slidable to move said second valve member from said second valve seat; said trigger valve assembly being located between said piston and said source of compressed air, whereby when said first valve member is moved from said first valve seat compressed air is admitted to said piston so as to slide said piston and move said second valve member from said second valve seat; said firing valve assembly being located between said mechanism and said source of compressed air, whereby when said second valve member is moved from said second valve seat compressed air is admitted to said mechanism; a valve stem on which said second valve member is fixed, a spring normally maintaining said second valve member on said second valve seat, and means on said piston to engage said valve stem when said piston is caused to slide, whereby said second valve member is moved from said second valve seat; and an exhaust tube, a normally open port in said firing valve assembly communicating with said tube, air from said mechanism exhausting through said port and tube, and means to block said port when said piston is caused to slide.

2. The remote control air valve of claim 1 including a sleeve fixed in said firing valve assembly, said piston being cup-shaped and adapted to slide about the outside of said sleeve, the means on said piston comprising a member having a recess to receive said valve stem, said recessed member being adapted to slide in said sleeve, said port being located in said sleeve, the top of said recessed member normally being adjacent the bottom of said port, and the bottom of said recess normally being spaced from the lower end of said valve stem a distance about equal to the width of said port, whereby initial sliding movement of said piston causes the top of said recessed member to close said port and the bottom of the recess to engage said valve stem, further sliding movement of said piston thereby lifting said second valve member from said second valve seat.

3. A remote control air valve including a main firing valve assembly for introducing compressed air from a suitable source to mechanism to be air activated and a trigger valve assembly to actuate said firing valve assembly; said trigger valve assembly including a first valve seat, a first valve member normally seating in air tight relationship on said first valve seat, and means to move said first valve member from said first valve seat; said firing valve assembly including a second valve seat, a second valve member normally seating in air tight relationship on said second valve seat, and a piston slidable to move said second valve member from said second valve seat; said trigger valve assembly being located between said piston and said source of compressed air, whereby when said first valve member is moved from said first valve seat compressed air is admitted to said piston so as to slide said piston and move said second valve member from said second valve seat; said firing valve assembly being located between said mechanism and said source of compressed air, whereby when said second valve member is moved from said second valve seat compressed air is admitted to said mechanism; said trigger valve assembly including a main sleeve, said first valve seat being located in said sleeve and said first valve member being movable in said sleeve, a relatively weak spring normally maintaining said first valve member on said first valve seat and said means to move said first valve member from said first valve seat including a valve button slidable in said main sleeve.

4. The remote control air valve of claim 3 including a trigger which abuts said valve button.

5. The remote control air valve of claim 3 in which said piston is provided with air clearance beneath it and said main sleeve is provided with a hole and a groove, said hole communicating with said clearance and with said groove, said groove constituting an exhaust passage to atmosphere, and means on said valve button to close said groove when said valve button is caused to slide so as to move said first valve member from said first valve seat.

6. The remote control air valve of claim 5 in which said hole is located below said first valve seat, whereby when said valve button is caused to slide so as to close said groove and move said first valve member from said first valve seat, compressed air moves from said source, around said first valve member, and through said hole to said clearance whereby to move said piston.

7. The remote control air valve of claim 2 in which said trigger valve assembly includes a main sleeve, said first valve seat being located in said sleeve and said first valve member being movable in said sleeve, a relatively weak spring normally maintaining said first valve member on said first valve seat, and said means to move said first valve member from said first valve seat including a valve button slidable in said main sleeve.

8. The remote control air valve of claim 7 in which said piston is provided with air clearance beneath it and said main sleeve is provided with a hole and a groove, said hole communicating with said clearance and with said groove, said groove constituting an exhaust passage to atmosphere, and means on said valve button to close said groove when said valve button is caused to slide so as to move said first valve member from said first valve seat.

9. The remote control air valve of claim 8 in which said hole is located below said first valve seat, whereby when said valve button is caused to slide so as to close said groove and move said first valve member from said first valve seat, compressed air moves from said source, around said first valve member, and through said hole to said clearance whereby to move said piston.

10. The remote control air valve of claim 9 including a trigger which abuts said valve button.

References Cited in the file of this patent
UNITED STATES PATENTS

| | | |
|---|---|---|
| 636,907 | Lane | Nov. 14, 1899 |
| 680,852 | Foster | Aug. 20, 1901 |
| 2,899,835 | Dalton | Aug. 18, 1959 |